Patented Mar. 17, 1936

2,034,629

UNITED STATES PATENT OFFICE 2,034,629

PROCESS FOR PREPARING BROMINATED METHYLBENZANTHRONES

Wilhelm Moser, Riehen, and Walter Fioroni, Binningen, Switzerland, assignors to the firm Society of Chemical Industry in Basle, Basel, Switzerland No Drawing. Application March 13, 1935, Serial No. 10,914. In Switzerland March 17, 1934

3 Claims. (Cl. 260—61)

The present invention relates to dyestuffs of the anthraquinone series. It comprises the process of making these dyestuffs as well as the new products themselves.

This invention relates to the manufacture of halogen derivatives of benzanthrone which are valuable as intermediate products for the manufacture of dyestuffs by treating a methylbenzanthrone of the general formula

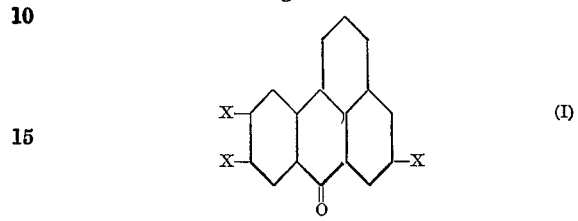

in which 2 X's stand for hydrogen atoms and one X for a methyl-group, with a halogenating agent in such a manner that one halogen atom is introduced into the benzanthrone molecule. Known methods may serve the purpose. The benzanthrones of the foregoing formula may be used as such or mixed with each other. Such a mixture, for example, is that produced when one extracts the 2-methylbenzanthrone from the mixture of methylbenzanthrones obtained in known manner from 2-methylanthraquinone.

When it is attempted to apply the known methods for halogenating benzanthrone to the above named mixture one cannot at once arrive at the desired goal, apparently because there is a great tendency of the parent material to suffer by-reactions.

It is a feature of the invention that there is obtained in a smooth manner a mono-halogenated methylbenzanthrone or mono-halogenated methylbenzanthrone mixture by treating with bromine or other halogen, preferably at a temperature not too high, the methylbenzanthrone or the mixture of methylbenzanthrones in a sulfuric acid of not less than 80 and not greater than 95 per cent. strength. The temperature of the bromination can be varied between 20° to 100° C.

The new halogenation products (probably methylated $Bz_1$-bromo- or other halogen-benzanthrone) may be used for the manufacture of various dyestuffs by subjecting them to reactions by which the Bz-halogenated benzanthrones are converted into dyestuffs. Among these products the brominated methylbenzanthrones of the general formula

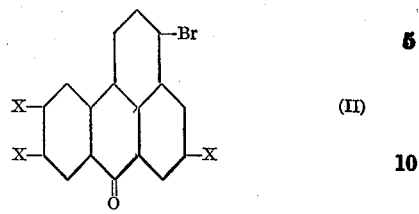

in which one X stands for a methyl group and the other two X's stand for hydrogen atoms, are particularly valuable. They form as such or mixed with one another light olive powders dissolving in sulfuric acid to red solutions which have a yellow fluorescence.

The following example illustrates the invention, the parts being by weight:—

100 parts of 6-methylbenzanthrone are dissolved cold in 1000 parts of sulfuric acid of 90 per cent. strength, and the solution is mixed at 55° C. with 72 parts of bromine. The mixture is maintained for 4 hours at this temperature, then cooled and transferred to a mixture of ice and sodium bisulphite solution; the solid matter is washed with water until neutral and dried. There is obtained a yellow-olive powder whose bromine content approximates to that of a monobromomethylbenzanthrone. The new product dissolves in sulfuric acid to a red solution which has a feeble yellow fluorescence. It corresponds to the formula

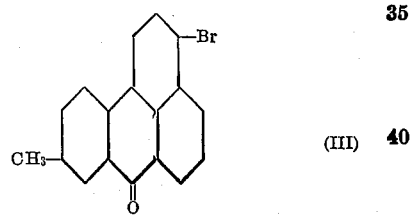

A product corresponding to the Formula II is obtained by brominating a mixture consisting mainly of 3-methylbenzanthrone, 6-methylbenzanthrone and 7-methylbenzanthrone. Such a product is for example obtained by dissolving the methylbenzanthrone mixture (itself obtainable in known manner from 2-methylanthraquinone) in glacial acetic acid, crystallizing and removing the 2-methylbenzanthrone of metling point 199° C., and mixing the mother liquor with water.

What we claim is:—

1. Process for the manufacture of a brominated benzanthrone, consisting in brominating a methylbenzanthrone of the general formula

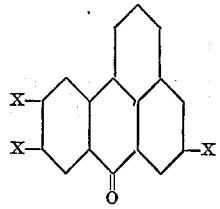

in which one X stands for methyl ad the two other X's stand for hydrogen atoms, in the presence of a sulfuric acid of not less than 80 and not greater than 95 per cent. strength, and at temperatures lying between 20° and 100° C., with bromine to a mono-brominated product.

2. Process for the manufacture of an intermediate product, consisting in brominating a mixture of 3-, 6- and 7-mono-methylbenzanthrone in the presence of a sulfuric acid of not less than 80 and not greater than 95 per cent. strength, and at temperatures lying between 20° and 100° C., with bromine to a mono-brominated product.

3. Process for the manufacture of an intermediate product, consisting in brominating the 6-methylbenzanthrone in the presence of a sulfuric acid of not less than 80 and not greater than 95 per cent. strength, and at temperatures lying between 20° and 100° C., with bromine to a mono-brominated product.

WILHELM MOSER.
WALTER FIORONI.